(12) United States Patent
Kassai et al.

(10) Patent No.: US 8,589,690 B2
(45) Date of Patent: Nov. 19, 2013

(54) INFORMATION PROCESSING APPARATUS, SERVER APPARATUS, MEDIUM RECORDING INFORMATION PROCESSING PROGRAM AND INFORMATION PROCESSING METHOD

(75) Inventors: Kunihiko Kassai, Kawasaki (JP); Toru Furuta, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 12/198,335

(22) Filed: Aug. 26, 2008

(65) Prior Publication Data

US 2009/0063853 A1    Mar. 5, 2009

(30) Foreign Application Priority Data

Aug. 28, 2007   (JP) ................................. 2007-221216

(51) Int. Cl.
*H04L 9/00* (2006.01)
*H04L 9/06* (2006.01)

(52) U.S. Cl.
USPC .............. 713/176; 713/166; 380/277; 726/26

(58) Field of Classification Search
USPC .......... 713/150, 155, 156, 185, 189; 380/255, 380/277
See application file for complete search history.

(56) References Cited

U.S. PATENT DOCUMENTS

| | | | |
|---|---|---|---|
| 5,604,803 A * | 2/1997 | Aziz .............................. | 713/155 |
| 5,923,756 A * | 7/1999 | Shambroom ................. | 713/156 |
| 5,996,076 A * | 11/1999 | Rowney et al. .............. | 713/156 |
| 6,853,988 B1 * | 2/2005 | Dickinson et al. ............ | 705/75 |
| 7,051,212 B2 * | 5/2006 | Ginter et al. ................. | 713/193 |
| 7,181,017 B1 * | 2/2007 | Nagel et al. ................... | 380/282 |
| 7,496,347 B2 * | 2/2009 | Puranik ......................... | 455/410 |
| 7,539,306 B2 * | 5/2009 | Ohta et al. .................... | 380/201 |
| 7,752,433 B2 * | 7/2010 | Yamauchi et al. ............ | 713/156 |
| 7,822,200 B2 * | 10/2010 | Cameron et al. ............. | 380/44 |
| 2004/0049687 A1 * | 3/2004 | Orsini et al. .................. | 713/189 |
| 2006/0117175 A1 * | 6/2006 | Miura et al. .................. | 713/155 |
| 2006/0177061 A1 * | 8/2006 | Orsini et al. .................. | 380/268 |
| 2006/0259765 A1 * | 11/2006 | Song et al. .................... | 713/166 |
| 2008/0137857 A1 * | 6/2008 | Bellare et al. ................. | 380/255 |

FOREIGN PATENT DOCUMENTS

| | | |
|---|---|---|
| JP | 06-169306 | 6/1994 |
| JP | 07-212356 | 8/1995 |
| JP | 2000-182102 | 6/2000 |
| JP | 2004-282295 | 10/2004 |

OTHER PUBLICATIONS

Japanese Office Action issued Feb. 14, 2012 in corresponding Japanese Patent Application No. 2007-221216 (3 pages) (2 pages of English translation).

* cited by examiner

*Primary Examiner* — Kambiz Zand
*Assistant Examiner* — Shiuh-Huei Ku
(74) *Attorney, Agent, or Firm* — Staas & Halsey LLP

(57) ABSTRACT

A client PC 10 adapted to be connected to a server apparatus 20 has a first information transmission section that transmits an ID required for authentication by the server apparatus 20 to the server apparatus 20, a second information acquiring section that acquires a master key to be obtained as a result of being authenticated by the server apparatus 20 from the server apparatus 20, a cryptographic key generation section that generates a cryptographic key according to the first information and the second information, an encryption section that encrypts data by means of the cryptographic key and an encrypted data transmission section that transmits the encrypted data encrypted by the encryption section to the server apparatus 20.

11 Claims, 4 Drawing Sheets

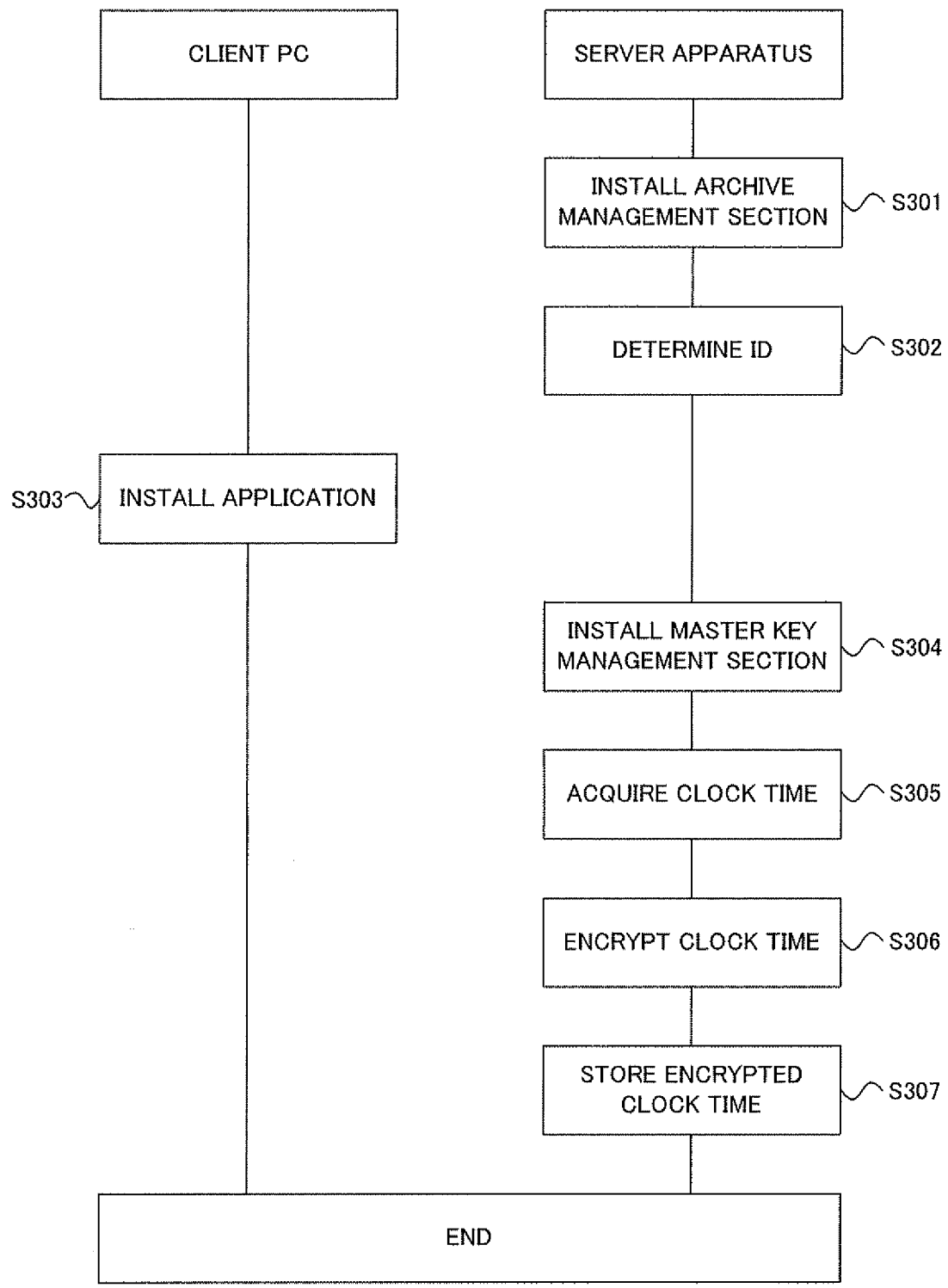

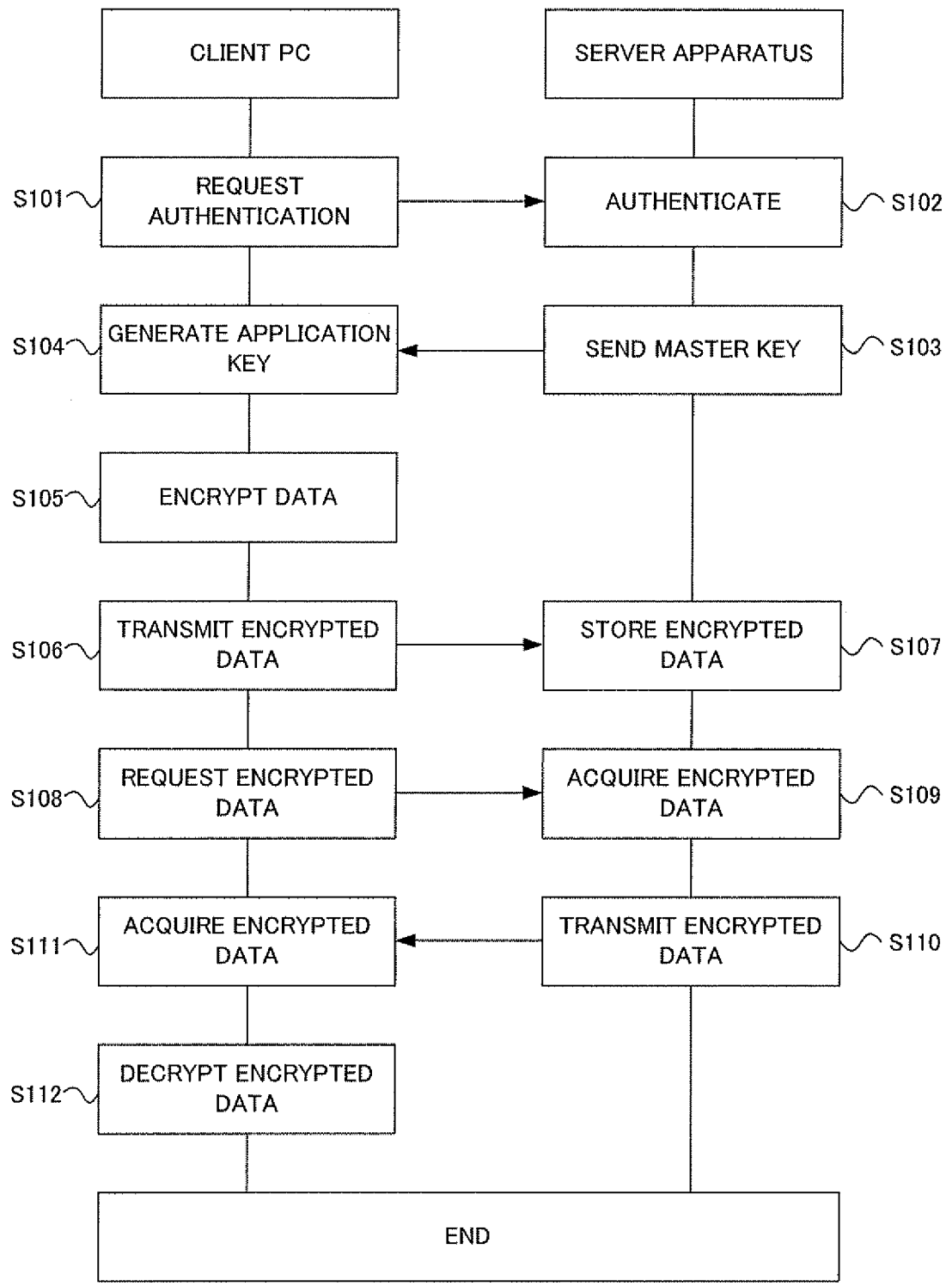

INFORMATION PROCESSING APPARATUS, SERVER APPARATUS, MEDIUM RECORDING INFORMATION PROCESSING PROGRAM AND INFORMATION PROCESSING METHOD

BACKGROUND OF THE INVENTION

1. Field of the Invention

This invention relates to an information processing apparatus adapted to generate a cryptographic key according to the key managed at a server apparatus and the ID specific to the application operating at a client apparatus, a server apparatus, a medium recording an information processing program and an information processing method.

2. Description of the Related Art

SANs (storage area networks), NASs (network attached storages) and DASs (direct attached storages) have recently been and being utilized in firms and universities in order to store and manage a vast quantity of data. In such systems, client apparatus can store data in any of the storages in and those connected to server apparatus so that the storage resources of the system can be shared to improve the efficiency of backup operations.

Additionally, the data stored outside the client apparatus are encrypted to raise the level of data storage security of the system and the cryptographic key to be used on the system is managed either by the client apparatus or by the server apparatus.

As a technique relating to the present invention, authentication methods of generating a common key at the time of authentication or at the time of sharing the key for the purpose of authentication of the partner without sharing a key are known (see, refer to Patent Document 1: Jpn. Pat. Appln. Laid-Open Publication No. 2000-182102).

However, when the client apparatus connected to a server apparatus manage the respective cryptographic keys in a system of the above-described type, each of the client apparatus need to be mounted with a key management mechanism and a key delivery mechanism for delivering the key to the server apparatus. Additionally, when a plurality of applications that are utilized by the client apparatus that manage respective cryptographic keys store data in a shared storage and the cryptographic key of one of the client apparatus leaks out all the data stored by the client apparatus can be decrypted by a data thief because the applications are encrypted by means of a same cryptographic key.

When, on the other hand, the cryptographic keys are managed by the server apparatus, any of the cryptographic keys can leak out when the server apparatus sends the cryptographic key to the proper client apparatus. Additionally, if any of the cryptographic keys managed by the server apparatus leaks out, all the encrypted and stored data that are managed by the system can be decrypted.

SUMMARY OF THE INVENTION

In view of the above-identified problems, therefore, the object of the present invention is to provide an information processing apparatus, a server apparatus, a medium recording an information processing program and an information processing method that do not require any shared cryptographic key and hence are not accompanied by any risk of leakage of a cryptographic key.

In an aspect of the present invention, the above object is achieved by providing an information processing apparatus adapted to be connected to a server apparatus, the apparatus including: a first information transmission section that transmits first information required for authentication by the server apparatus to the server apparatus; a second information acquiring section that acquires second information to be obtained as a result of being authenticated by the server apparatus from the server apparatus; a cryptographic key generation section that generates a cryptographic key according to the first information and the second information; an encryption section that encrypts data to be transmitted to the server apparatus by means of the cryptographic key; and an encrypted data transmission section that transmits the encrypted data encrypted by the encryption section to the server apparatus.

In another aspect of the present invention, there is provided a server apparatus adapted to make cipher communications with a client apparatus, the apparatus including: an authentication section that authenticates the client apparatus by first information transmitted from the client apparatus and required for the authentication; a second information transmission section that transmits second information to be utilized by the client apparatus to generate a cryptographic key to the client apparatus; and a data reception section that receives the encrypted data encrypted by the client apparatus according to the first information and the second information.

In still another aspect of the present invention, there is provided a medium recording a computer-readable information processing program capable of being connected to a server apparatus, the medium being adapted to cause a computer to execute: a first information transmission step that transmits first information required for authentication by the server apparatus to the server apparatus; a second information acquisition step that acquires second information obtained as a result of authentication by the server apparatus from the server apparatus; a cryptographic key generation step that generates a cryptographic key according to the first information and the second information; an encryption step that encrypts data to be transmitted to the server apparatus by means of the cryptographic key; and an encrypted data transmission step that transmits the encrypted data encrypted in the encryption step to the server apparatus.

In a further aspect of the present invention, there is provided an information processing method for connecting to a server apparatus, the method including: a first information transmission step that transmits first information required for authentication by the server apparatus to the server apparatus; a second information acquisition step that acquires second information obtained as a result of authentication by the server apparatus from the server apparatus; a cryptographic key generation step that generates a cryptographic key according to the first information and the second information; an encryption step that encrypts data to be transmitted to the server apparatus by means of the cryptographic key; and an encrypted data transmission step that transmits the encrypted data encrypted in the encryption step to the server apparatus.

Thus, the present invention can provide an information processing apparatus, a server apparatus, a medium recording an information processing program and an information processing method that do not require any shared cryptographic key and hence are not accompanied by any risk of leakage of a cryptographic key.

BRIEF DESCRIPTION OF THE DRAWINGS

FIG. 3 is a sequence chart of an exemplar operation of the introduction process of the embodiment of FIG. 1; and FIG. 4 is a sequence chart of an exemplar operation of the encryption process and the decryption process of the embodiment of FIG. 1.

DETAILED DESCRIPTION OF THE PREFERRED EMBODIMENTS

Now, the present invention will be described in greater detail by referring to the accompanying drawings that schematically illustrate a preferred embodiment of the invention.

Figure 1:
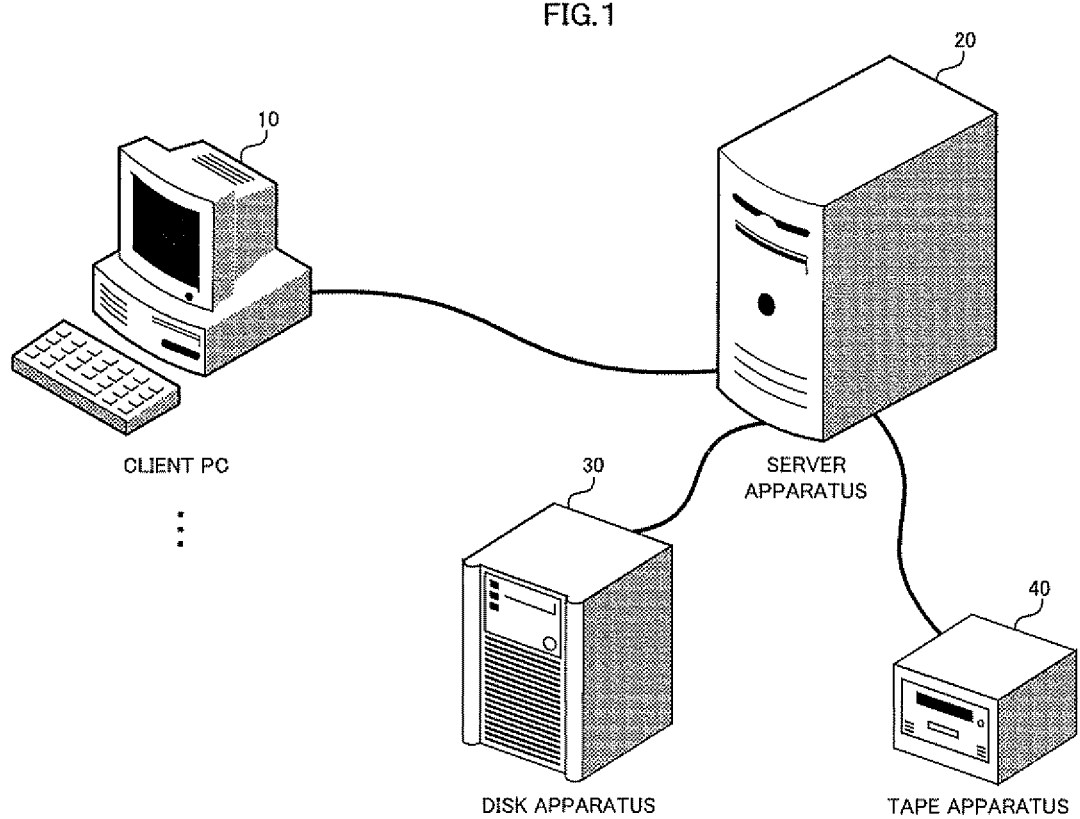
FIG. 1 is a schematic illustration of an embodiment of the present invention, showing an exemplar overall configuration thereof.

FIG. 1 is a schematic illustration of an embodiment of the present invention, showing an exemplar overall configuration thereof. As shown in FIG. 1, a server apparatus 20 is connected to a client PC 10, a disk apparatus 30 and a tape apparatus 40. The connections may be realized by way of the Internet or by way of one or more than one local networks.

The client PC 10 (information processing apparatus) encrypts data and stores them in the disk apparatus 30 by way of the server apparatus 20. When the client PC 10 utilizes some of the stored data, it acquires the data from the disk apparatus 30 by way of the server apparatus 20 and decrypts them. The server apparatus 20 additionally stores the data that the client PC 10 stored in the disk apparatus 30 in the tape apparatus 40 as backup data. The disk apparatus 30 is typically a hard disk that is fault-tolerant such as a disk array, whereas the tape apparatus 40 typically can store a large quantity of data on a tape medium such as an LTO or a DLT. It is assumed here that the tape medium where data are written by the tape apparatus 40 is available not only to the embodiment as backup medium but also to other systems.

Figure 2:
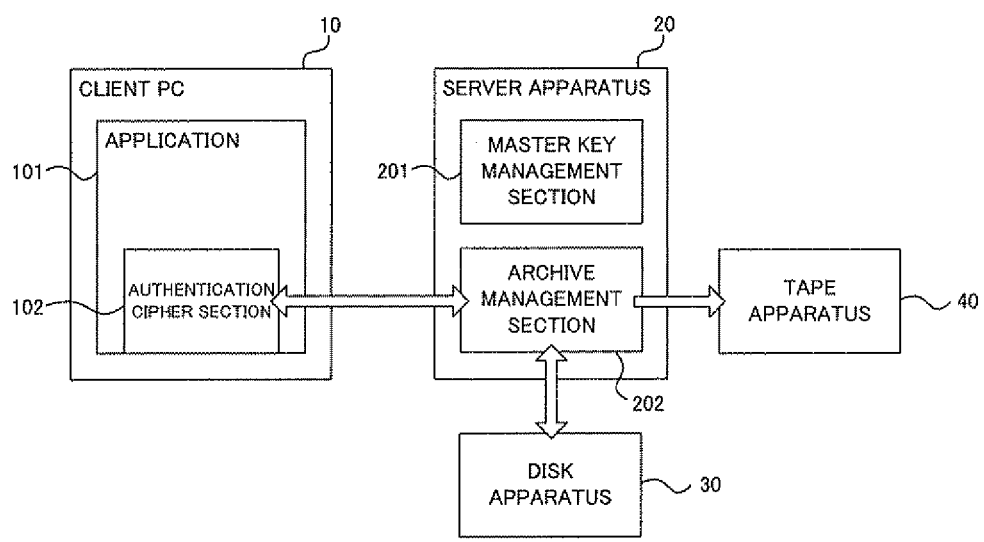
FIG. 2 is a schematic block diagram of the client PC and the server apparatus of the embodiment of FIG. 1, showing exemplar configurations thereof.

FIG. 2 is a schematic block diagram of the client PC and the server apparatus of this embodiment, showing exemplar configurations thereof.

The client PC 10 is provided with an application 101, which has an authentication cipher section 102 (a first information transmission section, a second information acquisition section, a cryptographic key generation section, an encryption section, an encrypted data transmission section, an encrypted data acquisition section, a decryption section, a second information decryption section). The server apparatus 20 has a master key management section 201 (a second information generation section, a second information encryption section) and an archive management section 202 (an authentication section, a second information transmission section, a data reception section) that correspond to the application 101.

The application 101 of the client PC 10 is an application adapted to store data in the disk apparatus 30 by way of the server apparatus 20. The authentication cipher section 102 requests authentication to the archive management section 202 when the application 101 transmits data to the server apparatus 20. The application generates an application key according to the information to be used for the authentication (first information) and the master key and encrypts the data to be transmitted to the server apparatus 20 by means of the generated application key. When the application 101 utilizes some of the data stored in the disk apparatus 30, it acquires the data by way of the server apparatus 20 and decrypts them. The authentication cipher section 102 has a unique key that is common to the master key management section 201 that corresponds to the application 101.

The master key management section 201 of the server apparatus 20 generates and manages a master key (second information) and encrypts the master key by means of the unique key that the master key management section 201 stores and is common to the authentication cipher section 102. The archive management section 202 authenticates the authentication cipher section 102 and stores the encrypted data transmitted from the authentication cipher section 102 in the disk apparatus 30 and the tape apparatus 40.

Now, the operation of this embodiment will be described below. FIG. 3 is a sequence chart of an exemplar operation of the introduction process of this embodiment.

Firstly, the archive management section 202 that corresponds to the application 101 to be installed in the client PC 101 is installed in the server apparatus 20 (S301) and the ID for authenticating the authentication cipher section 102 of the application 101 of the client PC is determined by the archive management section 202 (S302).

Then, the application 101 is installed in the client PC 10 (S303).

Then, the master key management section 201 is installed in the server apparatus 20 (S304). The master key management section 201 acquires the clock time of installation thereof from the server apparatus 20 as master key (S305), encrypts the clock time by means of the unique key (S306) and stores it in the storage of the server apparatus 20 (S307).

It may be arranged in advance that the encrypted clock time (master key) is stored in an arbitrarily selected place of the system other than the server apparatus 20.

As the master key is generated at the time of installing the master key management section 201 in the server apparatus 20 and the unique key common to the authentication cipher section 102 and the master key management section 201 is encrypted and stored, the master key is never exchanged between the client PC 10 and the server apparatus 20 as plain data and the unique key for encrypting the master key never leaks out.

FIG. 4 is a sequence chart of an exemplar operation of the encryption process and the decryption process of this embodiment. In FIG. 4, it is assumed that the application and the master key management section and the archive management section that correspond to the application have already been installed.

Firstly, the authentication cipher section 102 of the application 101 of the client PC 10 transmits a predefined ID to the archive management section 202 and requests authentication (S101, the first information transmission step) and the archive management section 202 of the server apparatus 20 authenticates the authentication cipher section 102 (S102), acquires the master key that is encrypted by the master key management section 201 by means of the unique key and sends it to the authentication cipher section 102 (S103).

As the authentication cipher section 102 acquires the encrypted master key, it decrypts the encrypted master key by means of the unique key it holds and generates the application key according to the master key and the ID used for the authentication (S104, the second information acquisition step, the second information decryption step, the cryptographic key generation step).

Then, the authentication cipher section 102 encrypts the business data that the application 101 stores by means of the generated application key (S105, the encryption step) and transmits the encrypted business data to the archive management section 202 (S106, the encrypted data transmission step) and the archive management section 202 that acquires the encrypted business data stores the encrypted business data in the disk apparatus 30 and the tape apparatus 40 (S107).

Additionally, the archive management section 202 adds the ID of the application stored in the header when it stores the encrypted business data in the tape apparatus 40 so that some other system may also be able to decrypt the encrypted business data. The ID may be decryptably encrypted and added only in an arbitrarily selected system.

The authentication cipher section 102 requests the archive management section 202 to provide the encrypted business data for the purpose of reutilizing the stored encrypted business data (S108). Upon receiving the request, the archive management section 202 acquires the encrypted business data from the disk apparatus 30 (S109) and transmits them to the authentication cipher section 102 (S110).

The authentication cipher section 102 acquires the encrypted business data (S111, the encrypted data acquisition step) and decrypts the encrypted data by means of the application key (S112, the decryption step).

When ending the application, the authentication cipher section 102 notifies the archive management section 202 of discarding the master key and ending the application.

As described above, the keys can be managed with ease in this embodiment because the embodiment can keep security by using an application key that is based on an ID and a master key and as a result of that the master key is managed by the master key management section 201. Additionally, since the ID differs from application to application, different application keys are generated respectively in a plurality of client PCs 10. Furthermore, different application keys are generated respectively by a plurality of applications that operate in the respective client PCs 10. Thus, the sets of data to be stored by different applications are encrypted in respective different ways to further raise the level of security. Still additionally, since data are encrypted and decrypted on the client PC 10, information is prevented from leaking when transferring data to the server apparatus 20.

Still additionally, the present invention can provide, as information processing program, the program for causing the computer that constitutes the information processing apparatus to execute the above-described steps. The above-described program can be stored in a computer-readable recording medium so as to have the computer that constitutes the information processing apparatus execute the program. Computer-readable recording mediums that can be used for the purpose of the present invention include internal storage mediums mounted in the inside of computers such as ROMs and RAMs, portable storage mediums such as CD-ROMs, flexible disks, DVDs, magneto-optical disks and IC cards, databases adapted to hold computer programs, other computers, the databases of such computers and transmission mediums on communication lines.

As described above, since this embodiment generates cryptographic keys for the respective applications operating in the respective client apparatus connected to the server apparatus, it does not need to store a common cryptographic key and hence there is no risk of leaking any of the cryptographic keys to allow highly secure cipher communications to take place.

What is claimed is:

1. An information processing apparatus adapted to be connected to a server apparatus, the information processing apparatus comprising:
    a first information transmission section that transmits first information to the server apparatus for performing authentication;
    a second information acquisition section that acquires second information to be obtained as a result of the authentication, from the server apparatus, the second information being encrypted by the server apparatus by using a first unique key held by the server apparatus;
    a second information decryption section that decrypts the obtained second information by using a second unique key which is common to the first unique key and held by the information processing apparatus;
    a cryptographic key generation section that generates a cryptographic key different from the second unique key, based on the first information and the decrypted obtained second information;
    an encryption section that encrypts data to be transmitted to the server apparatus with the cryptographic key; and
    an encrypted data transmission section that transmits the encrypted data to the server apparatus.

2. The information processing apparatus according to claim 1, further comprising:
    an encrypted data acquisition section that acquires the encrypted data from the server apparatus; and
    a decryption section that decrypts the encrypted data encrypted with the generated cryptographic key.

3. A server apparatus adapted to make cipher communications with an information processing apparatus, the server apparatus comprising:
    a second information generation section that generates second information to be utilized for generation of a cryptographic key by the information processing apparatus;
    an authentication section that authenticates the information processing apparatus by first information transmitted from the information processing apparatus;
    a second information encryption section that encrypts the generated second information with a first unique key which is common to a second unique key of the information processing apparatus to decrypt the second information by the information processing apparatus;
    a second information transmission section that transmits, to the information processing apparatus, the encrypted generated second information for generation by the information processing apparatus of the cryptographic key different from the second unique key; and
    a data reception section that receives encrypted with the cryptographic key generated by the information processing apparatus based upon the first information and the decrypted generated second information.

4. The server apparatus according to claim 3, wherein the data reception section stores the received encrypted data.

5. The server apparatus according to claim 4, wherein the data reception section adds information according to the first information to the encrypted data and stores the encrypted data and the added information.

6. The server apparatus according to claim 4, wherein the data reception section transmits the stored encrypted data in response to a request.

7. The server apparatus according to claim 3,
    wherein the second information generation section generates the second information with the clock time when the second information generation section is installed to the server apparatus.

8. A computer readable, non-transitory medium recording a program for causing a computer to execute a process for connecting to a server apparatus, the process comprising:
    transmitting first information to the server apparatus for performing authentication;
    acquiring second information obtained as a result of the authentication from the server apparatus, the second information being encrypted by the server apparatus by using a first unique key held by the server apparatus;
    decrypting the obtained second information with a second unique key which is common to the first unique key;

generating a cryptographic key different from the second unique key, based on the first information and the decrypted obtained second information;

encrypting data to be transmitted to the server apparatus with the cryptographic key; and transmitting the encrypted data to the server apparatus.

9. The non-transitory medium recording according to claim 8, the process further comprising:

acquiring the encrypted data; and decrypting the encrypted data encrypted with the generated cryptographic key.

10. An information processing method for connecting to a server apparatus, the method comprising:

transmitting first information to the server apparatus for performing authentication;

acquiring second information obtained as a result of the authentication from the server apparatus, the second information being encrypted by the server apparatus by using a first unique key held by the server apparatus;

decrypting the second information with a second unique key which is common to the first unique key;

generating a cryptographic key different from the second unique key, based on the first information and the decrypted second information;

encrypting data to be transmitted to the server apparatus with the cryptographic key; and transmitting the encrypted data to the server apparatus.

11. The information processing method according to claim 10, further comprising:

acquiring the encrypted data; and decrypting the encrypted data encrypted with the generated cryptographic key.

* * * * *

UNITED STATES PATENT AND TRADEMARK OFFICE
CERTIFICATE OF CORRECTION

PATENT NO. : 8,589,690 B2  Page 1 of 1
APPLICATION NO. : 12/198335
DATED : November 19, 2013
INVENTOR(S) : Kunihiko Kassai et al.

It is certified that error appears in the above-identified patent and that said Letters Patent is hereby corrected as shown below:

In the Claims

In Column 6, Line 39, In Claim 3, delete "encrypted" and insert -- data encrypted --, therefor.

Signed and Sealed this
Twenty-fifth Day of March, 2014

Michelle K. Lee
*Deputy Director of the United States Patent and Trademark Office*